United States Patent
Kan et al.

(10) Patent No.: US 10,191,690 B2
(45) Date of Patent: Jan. 29, 2019

(54) STORAGE SYSTEM, CONTROL DEVICE, MEMORY DEVICE, DATA ACCESS METHOD, AND PROGRAM RECORDING MEDIUM

(71) Applicant: NEC Corporation, Tokyo (JP)

(72) Inventors: Masaki Kan, Tokyo (JP); Jun Suzuki, Tokyo (JP); Yuki Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 107 days.

(21) Appl. No.: 15/126,856

(22) PCT Filed: Mar. 18, 2015

(86) PCT No.: PCT/JP2015/001498
§ 371 (c)(1),
(2) Date: Sep. 16, 2016

(87) PCT Pub. No.: WO2015/141219
PCT Pub. Date: Sep. 24, 2015

(65) Prior Publication Data
US 2017/0090823 A1 Mar. 30, 2017

(30) Foreign Application Priority Data
Mar. 20, 2014 (JP) .................................. 2014-058229

(51) Int. Cl.
*G06F 3/06* (2006.01)

(52) U.S. Cl.
CPC ............ *G06F 3/0659* (2013.01); *G06F 3/061* (2013.01); *G06F 3/067* (2013.01); *G06F 3/0611* (2013.01); *G06F 3/0656* (2013.01)

(58) Field of Classification Search
CPC ...... G06F 3/061; G06F 3/0656; G06F 3/0659; G06F 3/067
See application file for complete search history.

(56) References Cited

U.S. PATENT DOCUMENTS

2012/0233406 A1* 9/2012 Igashira .............. G06F 12/0804
711/118

FOREIGN PATENT DOCUMENTS

| JP | H04-273318 A | 9/1992 |
|---|---|---|
| JP | H11-045509 A | 2/1999 |

(Continued)

OTHER PUBLICATIONS

International Search Report corresponding to PCT/JP2015/001498, dated Jun. 9, 2015 (3 pages).

(Continued)

*Primary Examiner* — Yong J Choe
(74) *Attorney, Agent, or Firm* — Wilmer Cutler Pickering Hale and Dorr LLP (57) ABSTRACT

Provided is contribution for improving response performance. For that, a storage system includes a control device and a memory device that is connected to the control device via an interconnected network, wherein the memory device includes a data memory unit that stores data and a comparison write unit that performs a comparison write process of comparing first data specified by the control device with second data stored into a predetermined area in the data memory means and determining whether to update data in the predetermined area depending on a result of the comparison, and wherein the control device includes a read command issuance unit that issues a read command to the memory device; a write buffer memory unit that holds data that has been read based on the read command; and a comparison write command unit that designates data written to the write buffer memory means as the first data and instructs, in the form of a comparison write command, the memory device to perform the comparison write process.

13 Claims, 4 Drawing Sheets

(56) References Cited

FOREIGN PATENT DOCUMENTS

| JP | 2009-505281 A | 2/2009 |
| JP | 2012-003621 A | 1/2012 |
| JP | 2012-238061 A | 12/2012 |

OTHER PUBLICATIONS

Written Opinion corresponding to PCT/JP2015/001498, dated Jun. 9, 2015 (8 pages).

* cited by examiner

STORAGE SYSTEM, CONTROL DEVICE, MEMORY DEVICE, DATA ACCESS METHOD, AND PROGRAM RECORDING MEDIUM

CROSS-REFERENCE TO RELATED APPLICATIONS

This application is a national stage application of International Application No. PCT/JP2015/001498 entitled "Storage System, Control Device, Memory Device, Data Access Method, and Program Recording Medium," filed on Mar. 18, 2015, which claims the benefit of the priority of Japanese Patent Application No. 2014-058229, filed on Mar. 20, 2014, the disclosures of each of which are hereby incorporated by reference in their entirety.

TECHNICAL FIELD

The present invention relates to a storage system, a control device, a memory device, a data access method, and a program recording medium.

BACKGROUND ART

Various technologies relating to controlling data access to a storage device and storage system are known.

For example, a data store system composed of a single or a plurality of computers is available (e.g., database system, file system, and cache system). In recent years, a distributed storage system has often been applied to such systems. Such distributed storage system includes a plurality of general-purpose computers connected with one another via a network.

Such distributed storage system uses memory devices installed on these computers to store and supply data. The memory device may be, for example, a hard disk drive (HDD) or main memory (such as dynamic random-access memory (DRAM)).

In a distributed storage system as described above, on which computer the data is to be put and by which computer the data is to be processed are determined by software or special hardware. This architecture is called a shared nothing architecture.

In a storage area network (SAN), a memory device is shared among, for example, a plurality of servers via a network such as Fibre Channel (FC). For example, a data store system may be implemented by using a memory device shared in a SAN.

To implement a system where data is shared among a plurality of computers in a SAN, it is necessary to use software that is based on a shared everything architecture. For example, to implement a file system, the software may be SAN File System or the like. To implement a database system, the software may be, for example, Oracle® RAC (Real Application Clusters®).

A shared everything architecture is typically implemented by using FC or iSCSI (Internet Small Computer System Interface). FC and iSCSI involve significant communication delays. Thus, memory devices of excellent response performance are rarely used, and instead memory devices of lower response performance such as an HDD are mainly used.

On the other hand, HDDs are excellent in sequential access performance. For this reason, in database or other software pieces, techniques such as a write-ahead log are used to sequentially write only update information to compensate for the low performance of a shared memory device.

Recently available configurations include the one where a computer is connected to a high-speed memory device, such as a solid-state drive (SSD), via Peripheral Component Interconnect-Express (PCI-e), which is a high-speed and general-purpose interface. Such configuration allows for accessing a high-speed memory device with low latency. Thus, such configuration is used for applications such as caching for a storage on a SAN.

A shared everything architecture can be implemented by using a technology for sharing a PCI-e device in such configuration among a plurality of hosts with, for example, ExpEther®. With this configuration, a shared everything architecture achieves storage sharing with lower latency than the above-described storage on a SAN.

As described above, cluster-based distributed storage or distributed database technologies have been developed predicated on a shared nothing or shared storage architecture, which is a server-based architecture in the related art. To access resources belonging to another server, a server architecture in the related art conventionally necessitates accessing through the relevant server. On the other hand, a resource disaggregated architecture does not always necessitate going through a server to access resources because individual resources (memory, storage, and the like) are connected via an interconnected network and thus every resource can be physically shared by each central processing unit (CPU). As seen above, changes in server architectures have transformed distributed storage or distributed database technologies.

For example, for exclusive control of data, distributed systems in the related art use the two-phase or three-phase commit protocol or the Paxos algorithm to communicate between servers so as to implement the exclusive control. Additionally, aforementioned Oracle RAC uses a function called Cache Fusion to implement the exclusive control. A distributed key-value store uses a hash function to distribute and determine responsible nodes, and these nodes manage data in units of exclusion (for example, in units of record). For example, a transaction spanning a plurality of records needs to use the above-mentioned two-phase commit or the like between nodes to implement exclusive control.

These are designed with the assumption that communications between servers take a longer time than communications with resources within a server. Concerning the relationship between a server-to-resource communication time and a server-to-server (CPU-to-CPU) communication time, a resource disaggregated architecture presumes that server-to-server (CPU-to-CPU) communications do not always predominate but are equal (or less dominant). Thus, for exclusive control on a system running on a resource disaggregated architecture, such as a distributed storage database system, server-to-server communications need to be reduced and functions available on the resource side (limited hardware) can be utilized.

PTL 1 discloses a technique for managing an update to data by dividing a database object, such as a table or index, into fragments, duplicating (cloning) each fragment, and using the cloned fragments.

PTL 2 discloses a technique for exclusively performing an updating process from a plurality of computers by using a Compare and Swap (CAS) command in a configuration where a Key-Value Store (KVS) system with a function to handle the CAS command is shared.

CITATION LIST

Patent Literature

[PTL 1] Japanese Unexamined Patent Application Publication (Translation of PCT Application) No. 2009-505281

[PTL 2] Japanese Unexamined Patent Application Publication No. 2012-238061

SUMMARY OF INVENTION

Technical Problem

The disclosures of the related literatures given above are incorporated by reference herein. The following analysis is made from viewpoints of the present invention.

A first problem is that an exclusive control method requiring a plurality of communications between servers is subject to degrade performance under the influence of communication delays that are attributable to communications between the servers or utilization of computational resources on the server.

This is because, in a resource disaggregated architecture, each CPU accesses a memory device (storage) or memory via an interconnected network, requiring a time to access the physical memory device and additionally requiring a delay for every communication between the servers for the exclusive control.

A second problem is that the method requiring communications between the servers causes degraded performance that is attributable to excessive use of CPU resources.

This is because a process or thread for communications needs to be run on the server, requiring context switch cost and the CPU resources for communications. A server with less abundant CPU capability will be more highly influenced by this problem.

A third problem is that a shared memory device may be rewritten by another CPU, and thus the CPUs that are permitted to write need to be limited.

This is because, in the distributed storage system such as the database system, the data structure in a memory device may be changed for the purpose of effective utilization of memory areas or load balancing. To prevent this, a mechanism is needed to ensure that responsible computers are changed depending on the area or that exclusive information is checked in an area on the shared memory device every time data is written, which will cause response delays and eventually degraded performance.

For example, the technique disclosed in PTL 1 requires dividing a database object into fragments and holding cloned fragments corresponding to the individual fragments. Hence, the technique disclosed in PTL 1 might generate a greater database load. Consequently, the technique disclosed in PTL 1 might cause response delays leading to degraded performance.

According to the technique disclosed in PTL 2, a memory device itself is not shared but accessed only from a server operating the KVS, and thus the CPUs permitted to write are limited. Consequently, CPU resources for the server operating the KVS as well as server-to-server communications are needed, which poses a problem similar to the second problem.

Therefore, an object of the present invention is to provide a storage system, a control device, a memory device, a data access method, a method for controlling a memory device, and a program recording medium that contribute to improved response performance.

Solution to Problem

The first aspect of the present invention is that
a storage system includes at least one control device and at least one memory device that is connected to the control device via an interconnected network.

The memory device includes:
data memory unit that stores data; and
comparison write unit that performs a comparison write process of comparing first data specified by the control device with second data stored into a predetermined area in the data memory unit and determining whether to update data in the predetermined area depending on a result of the comparison.

And the control device includes:
read command issuance unit that issues a read command to the memory device;
write buffer memory unit that holds data that has been read based on the read command; and
comparison write command unit that designates data written to the write buffer memory unit as the first data and instructs, in the form of a comparison write command, the memory device to perform the comparison write process.

The second aspect of the present invention is that
a control device includes
read command issuance unit that issues a read command to the memory device;
write buffer memory unit that holds data that has been read based on the read command; and
comparison write command unit that designates data written to the write buffer memory unit as the first data and performs a comparison write process of determining, based on a result of comparing the first data with second data stored into a predetermined area by a memory device, whether to update data in the predetermined area.

The third aspect of the present invention is that
a memory device includes:
data memory unit that stores data; and
comparison write unit that performs a comparison write process of comparing first data specified by the control device with second data stored into a predetermined area in the data memory unit and determining whether to update data in the predetermined area depending on a result of the comparison.

The fourth aspect of the present invention is that
a data access method includes steps of:
issuing a read command;
holding data that has been read into a first area, the data being designated as first data; and
instructing to perform a comparison write process of determining, based on a result of comparing the first data with second data stored into a second area that is different from the first area, whether to update data stored into the second area.

This method is linked to a specific machine such as control device for controlling data access.

The fifth aspect of the present invention is that
a program recording medium that records a program causing a computer that controls a control device to execute the processes of:
issuing a read command to the memory device;
holding data that has been read into a first area, the data being designated as first data; and
instructing to perform a comparison write process of determining, based on a result of comparing the first data with second data stored into a second area that is different from the first area, whether to update data stored into the second area.

The program can be recorded in a computer-readable storage medium. The storage medium may be a non-transient medium such as semiconductor memory, a hard disk, a magnetic recording medium, or an optical recording medium. The present invention can also be embodied in a computer program product.

Advantageous Effects of Invention

There are provided a storage system, a control device, a memory device, a data access method, a method for controlling a memory device, and a program recording medium that contribute to improved response performance.

DESCRIPTION OF EMBODIMENTS

In the first place, an overview of one exemplary embodiment according to the present invention will be described with reference to FIG. 1. It should be noted that drawing reference symbols for the overview are added for convenience to respective elements as an example to aid in understanding, and that no limitation is intended in descriptions of the overview.

As described above, there is a desire for a storage system that contributes to improved response performance.

Figure 1:
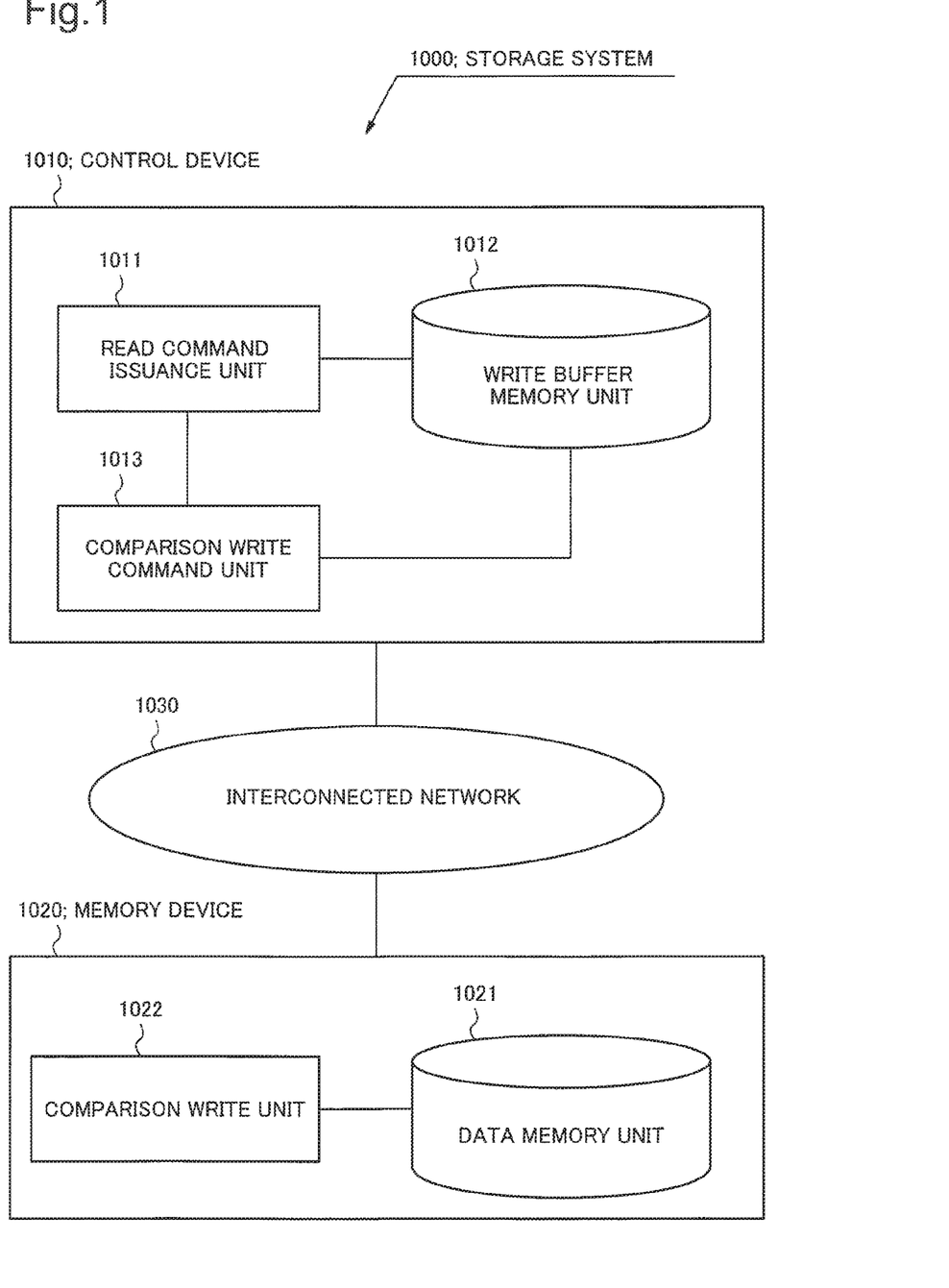
FIG. 1 is an explanatory diagram illustrating an overview of one exemplary embodiment according to the present invention.

To fulfill the desire, a storage system 1000 is provided as illustrated in FIG. 1 by way of example. The storage system 1000 is configured to include at least one control device 1010 and at least one memory device 1020. For simplicity, FIG. 1 illustrates one control device 1010 and one memory device 1020. The control device 1010 and the memory device 1020 are connected to each other via an interconnected network 1030.

The memory device 1020 includes a data memory unit 1021 and a comparison write unit 1022. Operations of the memory device 1020 can be implemented with hardware by mounting circuit components, i.e., hardware components such as a large-scale integration (LSI) circuit. Alternatively, the operations can be implemented with software by storing a program that provides the functions into a software storage medium (not illustrated), loading the program into main memory, and executing it in a CPU.

The data memory unit 1021 stores data. The comparison write unit 1022 performs a comparison write process. The comparison write process refers to a process of comparing first data specified by the control device 1010 with second data stored in a predetermined area in the data memory unit 1020 and determining whether to update data in the predetermined area based on the comparison result.

The control device 1010 includes a read command issuance unit 1011, a write buffer memory unit 1012, and a comparison write command unit 1013. Operations of the respective units in the control device 1010 can be implemented with hardware by mounting circuit components, i.e., hardware components such as a large-scale integration (LSI) circuit. Alternatively, the operations can be implemented with software by storing a program that provides the functions into a software storage medium (not illustrated), loading the program into main memory, and executing it in a CPU.

The read command issuance unit 1011 issues a read command to the memory device 1020. The write buffer memory unit 1012 holds data that has been read according to the read command. That is, after issuing the read command, the control device 1010 reads data from the memory device 1020 and stores the read data to the write buffer memory unit 1012.

The comparison write command unit 1013 designates the data written to the write buffer memory unit 1012 as first data, and gives an instruction, in the form of a comparison write command, to the memory device 1020 to perform the comparison write process.

In the storage system 1000, exclusive control among control devices 1010 is not needed because the control device 1010 that accesses the memory device 1020 is limited.

In the storage system 1000, the memory device 1020 performs the comparison write process. Thus, the memory device 1020 does not have to change the control devices 1010 permitted to write depending on the area, or to check information for identifying the control device 1010 in an area on the memory device every time data is written. In other words, in the storage system 1000, the comparison write process reduces a processing load carried by the memory device 1020 during writing. Consequently, the storage system 1000 contributes to improved response performance.

First Exemplary Embodiment

A first exemplary embodiment will now be described in detail with reference to the drawings.

Figure 2:
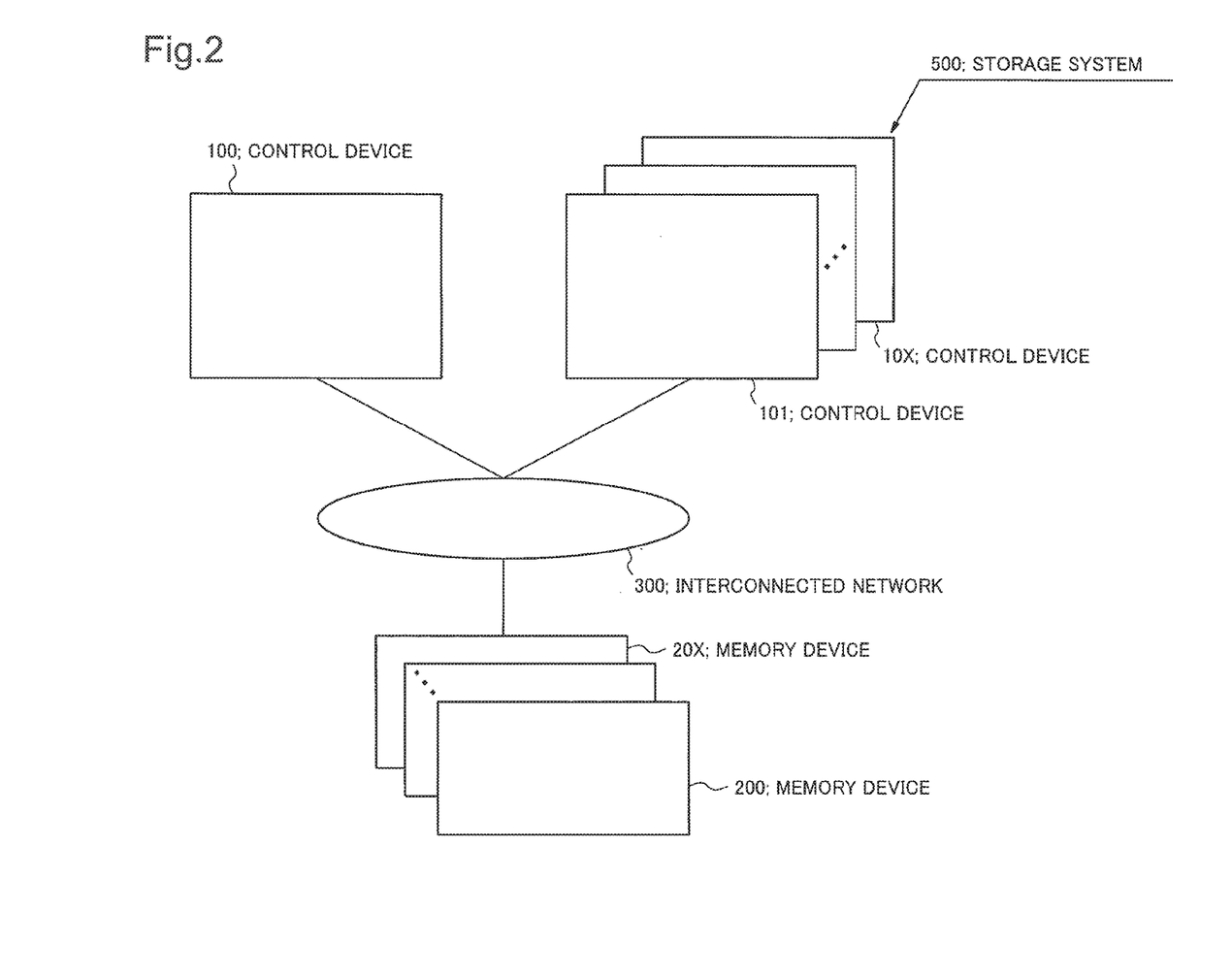
FIG. 2 is a block diagram illustrating an example overall configuration of a storage system 500.

FIG. 2 is a block diagram illustrating an example overall configuration of a storage system 500 according to the present exemplary embodiment. The storage system 500 is configured to include control devices (central processing units) 100 to 10X, memory devices 200 to 20X, and an interconnected network 300. The control devices 100 to 10X and the memory devices 200 to 20X are connected to each other via the interconnected network 300. For the purpose of explanation, control devices 100 to 10X are hereinafter denoted as control device 10X. Likewise, memory devices 200 to 20X are denoted as memory device 20X.

The storage system 500 constitutes a resource disaggregated architecture. As illustrated in FIG. 2, the storage system 500 functions as a computer server, with the control device 10X and the memory device 20X being connected to each other via the interconnected network 300.

The control device 10X is configured to include a computing means (e.g., a CPU), an interface for connecting to the interconnected network 300, a memory circuit (a register), and a CPU cache. Obviously, the control device 10X may additionally include a storage device such as memory.

The memory device 20X is configured to include an interface for connecting to the interconnect, a storage device, a means for accessing the storage device, and a means for supplying power. The storage device may be, for example, flash memory, DRAM, magnetoresistive random-access memory (MRAM), or HDD. Or, the storage device may be, for example, non-volatile memory (NVM) or an Express-compliant PCI-e flash card.

The interconnected network 300 connects the control device 10X and the memory device 20X with each other. The control device 10X and the memory device 20X transmit and receive data and information such as control messages to and from each other via the interconnected network 300. For example, the interconnected network 300 may be implemented with optical cables and switches. The interconnected network 300 may also be implemented with PCI-e.

The control device 10X may be a computer constructed by using a known architecture. In this case, the interconnected network 300 may be implemented with an Ethernet® PCI-e network. In addition, ExpEther® may be used to extend PCI-Express, which constitutes the interconnected network on the computer. In this way, the control device 10X holds an interface having an ExpEther function to be able to implement an "architecture similar to a resource disaggregated architecture". In this case, the memory device 20X preferably includes a device with ExpEther functions and a device with PCI-e functions. The device with the PCI-e functions may be a PCI-e flash redundant arrays independent disk (RAID) card. Alternatively, the device with the PCI-e functions may be, for example, a card with functions of general-purpose computing on graphics processing unit (GPGPU) or a computing board based on the Many Integrated Core (MIC) architecture.

The interconnected network 300 may be implemented with Fibre Channel or Fibre Channel over Ethernet (FCoE). In this case, the control device 10X may be a computer that is constructed by using a known architecture and includes a host bus adapter. The memory device 20X preferably includes an interface to the Fibre Channel or FCoE. Note that a network connecting to two or more control devices 10X may be different from the interconnected network 300. For example, Ethernet (Transmission Control Protocol (TCP))/Internet Protocol (IP)) may be used to connect the individual control devices 10X. Then, the Fibre Channel may be used to connect the control device 10X and the memory device 20X with each other.

Figure 3:
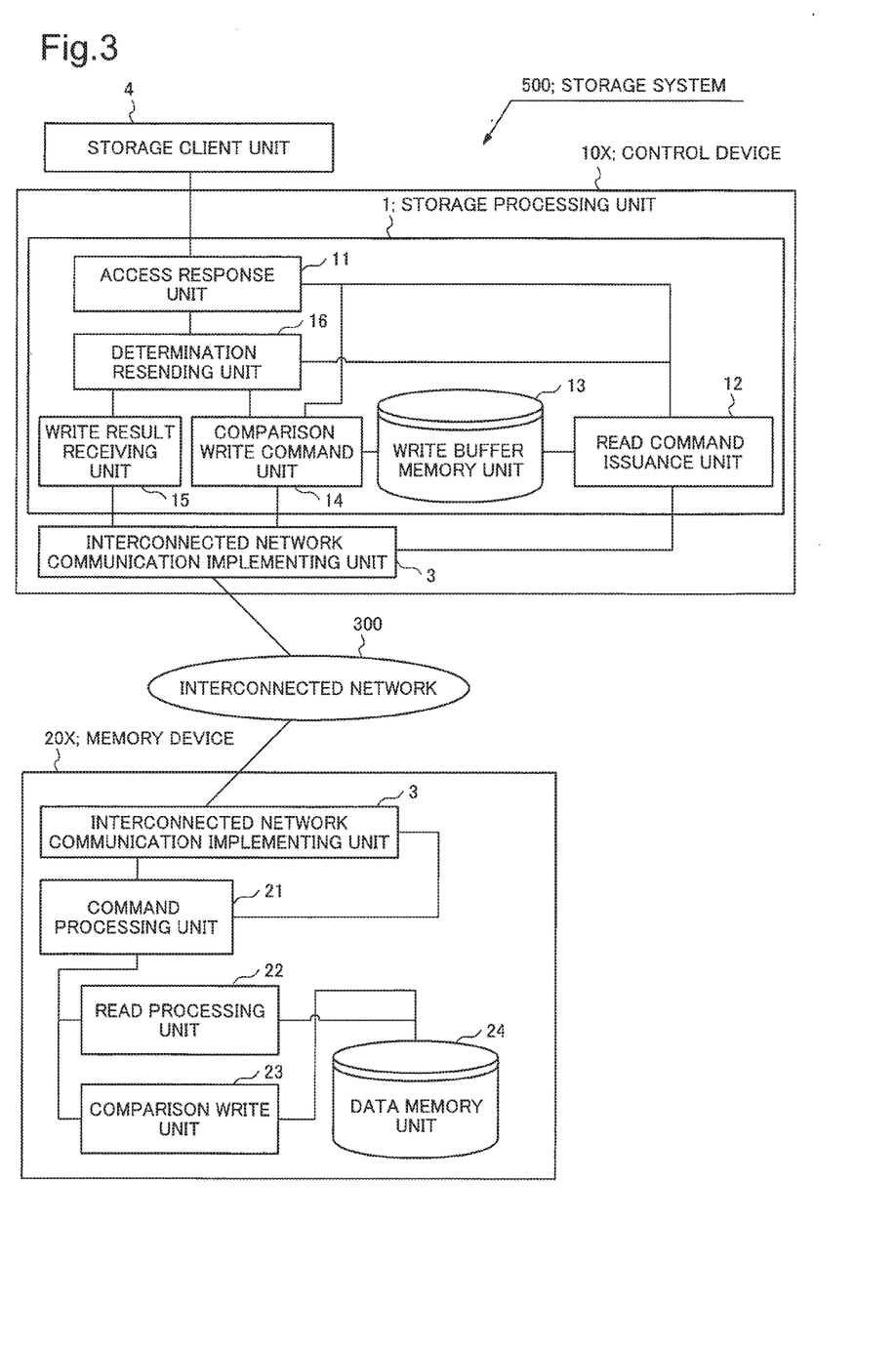
FIG. 3 illustrates example internal configurations of a control device 10X and a memory device 20X.

FIG. 3 illustrates example internal configurations of the control device 10X and the memory device 20X. For simplicity, FIG. 3 mainly illustrates modules related to the control device 10X and the memory device 20X according to the present exemplary embodiment.

A storage client unit 4 provides a function to access the distributed storage system. The storage client unit 4 may be software. The storage client unit 4 may be a software piece running inside the control device 10X. Alternatively, the storage client unit 4 may be a software piece running on a computer that is different from the control device 10X. In addition, operations of the storage client unit 4 can be implemented with hardware by mounting circuit components, i.e., hardware components such as a large-scale integration (LSI) circuit. Alternatively, the operations can be implemented with software by storing a program that provides the functions into a software storage medium (not illustrated), loading the program into main memory, and executing it in a CPU.

The internal configuration of the control device 10X will now be described in detail.

The control device 10X is configured to include a storage processing unit 1 and an interconnected network communication implementing unit 3. Operations of the control device 10X can be implemented with hardware by mounting circuit components, i.e., hardware components such as a large-scale integration (LSI) circuit. Alternatively, the operations can be implemented with software by storing a program that provides the functions into a software storage medium (not illustrated), loading the program into main memory, and executing it in a CPU. The storage processing unit 1 is configured to include an access response unit 11, a read command issuance unit 12, a write buffer memory unit 13, a comparison write command unit 14, a write result receiving unit 15, and a determination resending unit 16.

The storage processing unit 1 is a software piece implementing a database, KVS, or file system.

The interconnected network communication implementing unit 3 handles communications according to a predetermined communication protocol via the interconnected network 300. The interconnected network 300 may be hardware or software as long as it can perform relevant processes.

The access response unit 11 receives a storage access request (i.e., a processing command) from the storage client unit 4. In addition, the access response unit 11 returns a result of the processing command to the storage client unit 4.

For example, if the storage processing unit 1 constitutes a database system, the access response unit 11 may receive a data manipulation command specified in Structured Query Language (SQL) or the like. If the storage processing unit 1 constitutes a KVS, the access response unit 11 may receive commands to obtain, register, and update a value corresponding to a key.

The read command issuance unit 12 calculates a location of stored data (i.e., a data address) in the memory device 20X, in response to a processing command accepted by the access response unit 11. Then, the read command issuance unit 12 reads data from the calculated location. The read command issuance unit 12 then stores the data that has been read into the write buffer memory unit 13.

The write buffer memory unit 13 need only store data, without any details imposed. For example, the write buffer memory unit 13 may be a level 1 or level 2 CPU cache. If the control device 10X includes a main memory device, the write buffer memory unit 13 may be disposed on the main memory.

The comparison write command unit 14 issues the comparison write command to the memory device 20X. Specifically, the comparison write command unit 14 notifies the memory device of the first data (hereinafter called already-read data), a predetermined area for writing, and third data to be written (hereinafter called updated data). A predetermined area for writing corresponds to a location from which data has been read in the memory device 20X.

More specifically, the comparison write command unit 14 issues the comparison write command via the interconnected network communication implementing unit 3, using already-read data and updated data. Already-read data means the data that has been read and stored into the write buffer memory unit 13. Updated data means the data included in an access request sent from the storage client unit 4.

A comparison write command refers to a command that requests for performing the comparison write process and runs on the memory device 20X. For example, the comparison write command can be implemented by using the Fused Operation function included in the NVM Express Rev 1.1 standard specification. In this case, the memory device 20X is an NVM Express-compliant device.

The following describes the comparison write process performed in the storage system 500 according to the present exemplary embodiment.

When the comparison write command is issued, and if the data in the target area for writing is identical to the specified data, the memory device 20X writes data to the target area for writing (performs write).

On the other hand, if the data in the target area for writing is not identical to the specified data, the memory device 20X cancels the writing process (cancels write). In other words, if the first data is not identical to the data in the target area for writing, the memory device 20X maintains the data in the target area for writing.

As described above, the process that assures both the data comparison process and the write process is hereinafter called the comparison write process. In the storage system 500 according to the present exemplary embodiment, the comparison write unit 23 in the memory device 20X performs the comparison write process.

The write result receiving unit 15 receives a result of the comparison write command. The comparison write command refers to a command to perform the comparison write process requested by the comparison write command unit 14 and performed by the memory device 20X.

The write result receiving unit 15 transfers the received result to the determination resending unit 16. Upon receipt of a result to the effect that the comparison write process has failed, the determination resending unit 16 issues a command to retry the read processing to the read command issuance unit 12.

Or, upon receipt of a result to the effect that the comparison write process has failed, the determination resending unit 16 notifies the access response unit 11 that the comparison write process has failed. The access response unit 11 then notifies the storage client unit 4 that the comparison write process has failed. Then, the application utilizing the storage client unit 4 may execute a process to handle the failure in the comparison write processing.

For example, suppose that the application has attempted to execute a process of incrementing a predetermined integer value of a record (adding one to the record), and that the write result receiving unit 15 has received a result to the effect that the process has failed. Then, the storage processing unit 1 may resend a command to perform the process.

Also suppose that, for example, one of the control devices 10X has reconfigured a storage area. After that, the control device 10X issuing the comparison write command may fail to find the structure of the data stored in the target address for writing. In this case, the read command issuance unit 12 issues a command to re-read the target address for writing to read the data stored in the target address for writing. Then, the read command issuance unit 12 may issue the comparison write command so as to perform the comparison write process using the data obtained by the re-reading process and the data to be written.

The internal configuration of the memory device 20X will now be described in detail.

The memory device 20X is configured to include an interconnected network communication implementing unit 3, a command processing unit 21, a read processing unit 22, a comparison write unit 23, and a data memory unit 24. Operations of the memory device 20X can be implemented with hardware by mounting circuit components, i.e., hardware components such as a large-scale integration (LSI) circuit. Alternatively, the operations can be implemented with software by storing a program that provides the functions into a software storage medium (not illustrated), loading the program into main memory, and executing it in a CPU. The storage processing unit 1 is configured to include the access response unit 11, the read command issuance unit 12, the write buffer memory unit 13, the comparison write command unit 14, the write result receiving unit 15, and the determination resending unit 16.

The command processing unit 21 receives a command from the control device 10X and returns a result of executing the command to the control device 10X.

Specifically, the command processing unit 21 receives via the interconnected network 300 a command issued by the control device 10X. Specifically, the command processing unit 21 receives commands issued by the read command issuance unit 12 and the comparison write command unit 14. The command processing unit 21 transmits a received command to the read processing unit 22, the comparison write unit 23 or the like.

In addition, when the comparison write unit 23 updates data in a predetermined area to the updated data, the command processing unit 21 replies to the control device 10X to the effect that the comparison write process has succeeded. On the other hand, when the comparison write unit 23 maintains the data in a predetermined area after comparison, the command processing unit 21 replies to the control device 10X to the effect that the comparison write process has failed.

The read processing unit 22 performs the process of reading data stored in the data memory unit 24.

The comparison write unit 23 performs the comparison write process on data stored in the data memory unit 24. Specifically, the comparison write unit 23 compares the first data (aforementioned already-read data) specified by the control device with the second data (aforementioned data in the target area for writing) that is stored into a predetermined area in the data memory unit 24. Then, the comparison write unit 23 performs the comparison write process of determining whether to update data in the predetermined area, depending on a result of the comparison.

The data memory unit 24 stores and holds data. In addition, the data memory unit 24 includes a function to provide controls and the like based on characteristics of the storage medium. For example, the function to provide controls and the like based on characteristics of the storage medium may be implemented by using the logic on an integrated circuit or a field programmable gate array (FPGA). Specifically, the function to provide controls and the like based on characteristics of the storage medium may be implemented by using a flash memory controller or a DRAM controller. The storage medium may be, for example, flash memory, DRAM, or HDD, without any details imposed.

Operations of the storage system 500 according to the present exemplary embodiment will now be described.

Figure 4:
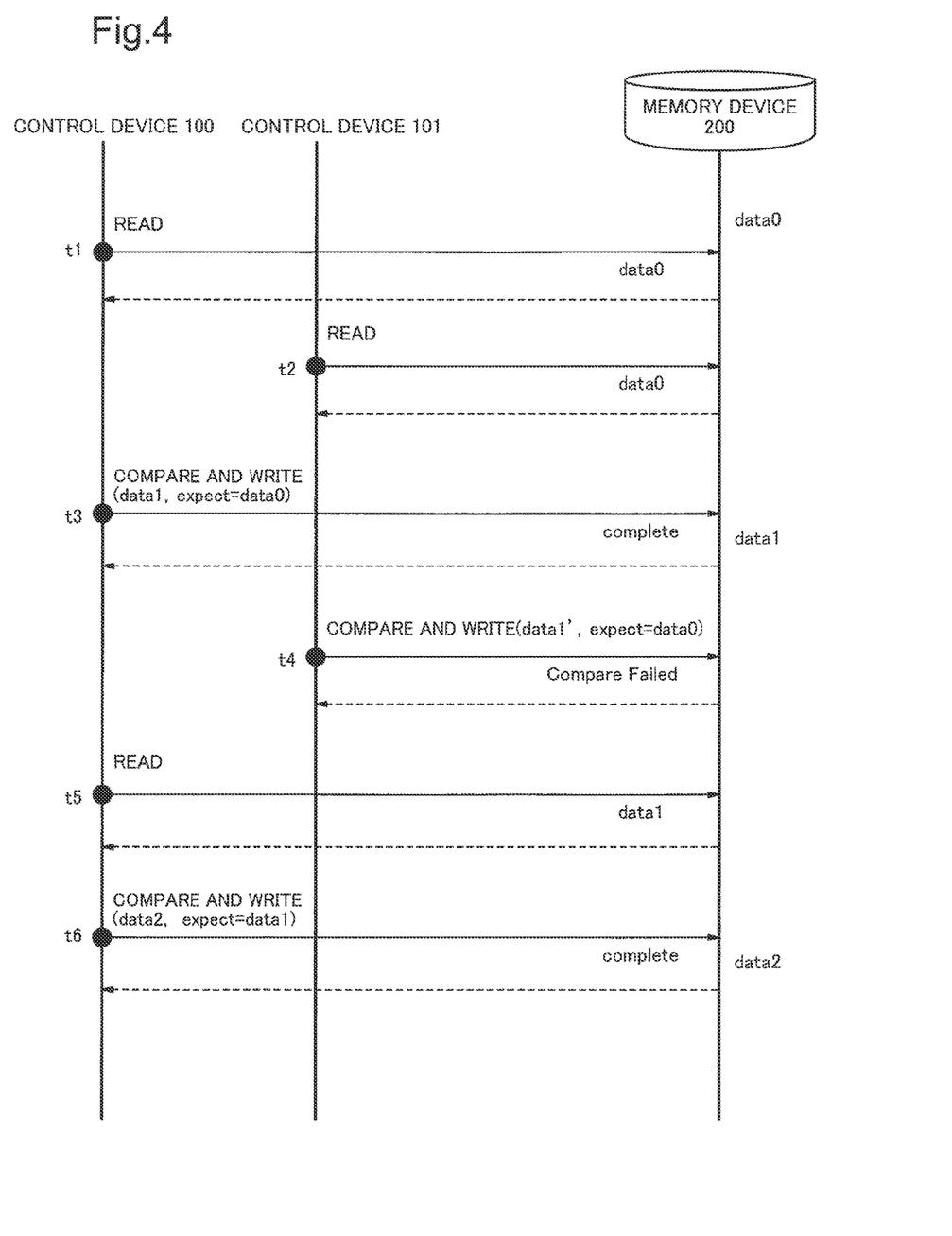
FIG. 4 illustrates example operations of the storage system 500.

FIG. 4 is a diagram illustrating example operations of the storage system 500 according to the present exemplary embodiment. Specifically, FIG. 4 illustrates the case where there is a conflict between data updating processes performed by the control device 100 and by control device 101. For simplicity, it is assumed that the data store software in FIG. 4 is a KVS. FIG. 4 illustrates example operations of executing an update command on a single key. Operations of the SQL processing on a relational database are essentially the same. For simplified explanation, descriptions of handling errors and the like are omitted in FIG. 4. Normally, when executing an update command on a single key, it is preferable to perform exception handling on physical or logical failures and operational mistakes on the user application.

First, at a timing t1 indicated in FIG. 4, the control device 100 receives an update access command from the storage client unit 4. The control device 100 then reads data from the memory device 20X. As of the timing t1, the memory device 20X holds data 0.

At a timing t2, which is later than the timing t1, the control device 101 receives an update access command from the storage client unit 4. Specifically, the control device 101 acquires data 0 based on the read command as of the timing t2. The control device 101 then stores the data 0 into the write buffer memory unit 13.

At a timing t3, which is later than the timing t2, the control device 100 issues a comparison write command, which is a command to rewrite the stored data to data 1 if the stored data is equal to data 0.

Since the data stored in the memory device 20X is data 0, the memory device 20X writes data 1 upon receipt of the command to rewrite data. In this example, the control device 100 issues a comparison write command before the control device 101 issues the same. Accordingly, the comparison write command issued by the control device 100 is successful.

At a timing t4, which is later than the timing t3, the control device 101 issues a command to rewrite the stored data to data 1' if the stored data is equal to data 0.

The timing t4 when the control device 101 issues a comparison write command is later than the timing t3 when the control device 101 issues the comparison write command. As of the timing t4, the data held in the memory device 20X is data 1. Accordingly, the comparison write command issued by the control device 101 fails. Thus, the control device 101 notifies the storage client unit 4 that data rewriting has failed. As a result, the application using the storage system 500 recognizes the failure in data rewriting and carries out a process suitable for the failure in data rewriting.

At a timing t5, which is later than the timing t4, the control device 100 may read data from the memory device 20X again. In this case, the control device 100 reads data 1.

At a timing t6, which is later than the timing t5, the control device 100 may perform the updating process after comparison with data 1. Specifically, at the timing t6, the control device 100 may issue a comparison write command, which is a command to rewrite the stored data to data 1 if the stored data is equal to data 0.

The updating process may be permitted by the application utilizing the storage system 500. Or, suppose that the application utilizing the storage system 500 is going to execute a transaction on one record. Executing a transaction on one record may be, for example, executing a process of adding a predetermined value to a value that has been read. In this case, the control device 100 may perform the processes of reading data again and updating data, as described above for the processes at the timings t5 and t6.

Also suppose that the control device 101 is going to perform, for example, defragmentation in a memory device 20X or migration between memory devices 20X, instead of rewriting data as requested by the application. In this case, data might be updated after the control device 10X performs the process of reading data (the read process). Hence, it is advantageous for the control device 10X to perform, after reading data, the process of writing data (the write process) based on a comparison write command.

Data pieces to be read, written, and compared, i.e., data 0 and data 1, may include any data such as any identifier of a record and a version number.

Actual data may not be necessarily included in either of data 0 and data 1. For example, actual data may be stored in a memory device different from the memory device 20X, which stores data 0 and data 1. In this case, data 0 and data 1 each may include management information on actual data. The management information may be controlled by the storage system 500.

The process of calculating a physical address will now be described in detail. Specifically, the following describes the process performed by the access response unit 11 to calculate a physical address on the memory device 200 based on an access identifier.

Where to access on a storage medium is often specified by using a logical or physical address. For example, as a storage medium, part or whole of the areas of the data memory unit 24 may be used for storing the data store software. It may not be able to use all of the data memory unit 24 because the data memory unit 24 may be partitioned to be used for one or at least two services. Or, it may not be able to use all of the data memory unit 24 because part of the data memory unit 24 may be allocated as areas to store management information for implementing the system.

In the memory device 20X according to the present exemplary embodiment, an address space in the data memory unit 24 to store data is divided into page blocks of any size to allow for accessing the relevant page block by using an ID (identification) of the page block. An ID of a page block is hereinafter called a page block ID.

By way of example, suppose that access is going to be made to the fifth page from the physical start address in a storage area with a page block ID=4. Then, the control device 10X can calculate a unique physical address of the page block ID based on the start address in an address space to store data, the page block ID, and page blocks. It is preferable to be able to reserve a continuous area, as an address space, for the data space. If any partitioned area is reserved as an address space, the control device 10X preferably holds a calculation block ID and a start address.

In addition, it is necessary to identify, by using a key, the page to be accessed (page block ID). In the storage system 500 according to the present exemplary embodiment, the memory device 200 converts an access identifier (for example, a value of a key) into a numeric value. As a method for converting an access identifier into a numeric value, a hash function (e.g., MD5) may be used, for example. In such cases, the control device 10X divides a calculated hash value by the total number of pages provided by the data memory unit 24. The control device 10X can calculate the total number of pages provided by the data memory unit 24 by dividing the storage capacity provided for storing the data store software in the data memory unit 24 by the page size. The control device 10X then determines the calculated remainder to be a page block ID. Once a page block ID is calculated, the control device 10X can calculate an address representing a page, based on the page block ID, the page size, and the start address.

By using the above-described method for calculating an address representing a page, the control device 10X can access a page that includes a key as long as the control device 10X holds the total number of pages (or total capacity) in the memory device 20X, the page size, the start address, and the hash function.

Two or more control devices 10X may share a predetermined memory device 20X. In this case, the two or more control devices 10X may share the total number of pages (or total capacity), the page size, the start address, and the hash function. As a result, the two or more control devices 10X can access a page area where an access identifier is stored. In case a failure occurs, the total number of pages (or total capacity), the page size, the start address, and the hash function remain unchanged unless a memory device 20X is added or removed. Thus, there is no need to transmit and receive the total number of pages and other data between control devices 10X. Consequently, the above-described method for calculating an address representing a page contributes to a higher speed of data store software.

Concerning a data structure in a page, the memory device 20X preferably stores a record, management information, and the like into a continuous area of a size that allows for one-time execution of a comparison write command. This is because, if the memory device 20X executes a comparison write command in units of record, the memory device 20X does not atomically check combinations of two or more addresses with data pieces for the comparison write command.

Even after defragmentation in a page, a binary character string for management information relating to a new write command may possibly match a binary character string for a record after defragmentation. To prevent a binary character string for management information from matching a binary character string for a record after defragmentation, the memory device 20X may store a unique information piece per predetermined size. For example, the memory device 20X may store an information piece that combines a value of a key with a block number per predetermined size.

In the storage system 500 according to the present exemplary embodiment, a control device 10X reads and writes data by using a storage medium (not illustrated) that is included in the control device 10X. Specifically, the storage processing unit 1 in the control device 10X reads data in units of page from the memory device 20X (the read process) and takes out a required value from the page. In other words, the control device 10X copies the data that has been loaded into a storage medium included in the control device 10X. Then, the control device 10X references the management information in a storage area where the data has been copied, and makes access to information about the required value based on the management information.

A process of duplicating data into two or more memory devices 20X will now be described.

If the storage system 500 includes two or more memory devices 20X, it may be necessary to divide access to the memory devices 20X. In such cases, the control device 10X may determine which memory device 20X to use by using some method such as consistent hashing.

When access to memory devices 20X is divided, the control device 10X preferably assures reliability by duplicating data. This is because, if the control device 10X selects two or more memory devices 20X to store data, these memory devices may be of different versions. In this case, data inconsistency may occur between or among the memory devices 20X. For example, suppose that the control device 10X uses consistent hashing to determine which memory device 20X to use for storing data. Then, the control device 10X can select two or more memory devices 20X by selecting the necessary number of adjacent nodes in a hash ring for consistent hashing.

As another example, consider the case where a control device 10X writes duplicates of data into three memory devices 20X. Suppose that the control device 100 and the control device 101 respectively issue in parallel a read command and then issue a write command to the three individual memory devices 20X. Then, writing may possibly be successful in a memory device 20X to which the control device 100 writes data and in a memory device 20X to which the control device 101 writes data.

To prevent this, it is necessary to assure consistency among duplicates by using, for example, the majority method when the control device 10X reads data after the write process is completed. In this case, however, the consistency is not assured until a read request is later generated, which may reduce redundancy resulting in decreased reliability. To prevent this, after completion of the write process, the consistency needs to be checked by carrying out the read process before returning a response to the application. This will result in degraded response performance.

In order to assure at least one successful write process as of the time when data has been written to a plurality of memory devices 20X, the control device 10X needs to, not write to three memory devices 20X in parallel, but first write to a single primary memory device (also called main memory device) 20X (which can be determined for each key by using any method) successfully, and then issue a write command to the remaining two memory devices 20X. One possible way that can be employed to determine a primary memory device 20X may be identifying a node that is first found in consistent hashing.

In this way, exclusive control is performed and version information (or time stamp information) is included in management information by the first primary memory device 20X, which can prevent a precedent write request from being overtaken by writing to the second or any subsequent memory device 20X. However, after data is successfully written to one or more storage media while a subsequent request is being handled, inconsistency might occur in case of a failure in the control device 10X that has issued the subsequent request. In such cases, consistency needs to be assured by using some method such as the majority method or giving priority to primary when data is being read.

As described above, in the storage system 500 according to the present exemplary embodiment, the control device 10X (e.g., CPU) and the memory device are connected to each other via the interconnected network. In the storage system 500 according to the present exemplary embodiment, the control device 10X stores into the write buffer memory unit 13 the data that has been read. The control device 10X then issues a comparison write command to be executed on the data held in the write buffer and on the data held by the memory device 20X. The control device 10X repeatedly issues a read command depending on whether the comparison write command has been completed. Thus, the storage system 500 according to the present exemplary embodiment contributes to a decrease in the number of network communications and to improved response performance of a distributed storage database system.

In addition, the storage system 500 according to the present exemplary embodiment uses an interconnected network to eliminate the need for communications between server devices (equivalent to the above-described control devices 10X). An interconnected network makes it possible to easily implement a less expensive and lower latency network than a network between server devices. Hence, the storage system 500 according to the present exemplary embodiment contributes to cost reduction and improved response performance.

The whole or part of above-described exemplary embodiments can be described as, but is not limited to, the following supplementary notes.

(Supplementary Note 1) The storage system according to the first aspect described above.

(Supplementary Note 2) The storage system according to Supplementary Note 1, wherein the comparison write command unit notifies the memory device of the first data, the predetermined area for writing, and third data to be written, and wherein the comparison write unit updates data in the predetermined area to the third data if the first data is identical to the second data, and keeps data in the predetermined area to be the second data if the first data is not identical to the second data.

(Supplementary Note 3) The storage system according to Supplementary Note 1 or 2, wherein the memory device further includes a command processing unit that receives a command from the control device and returns a result of processing of the command to the control device, wherein the control device further includes a write result receiving unit that receives a result of the comparison write command, wherein the command processing unit replies to the control device to the effect that the comparison write process has succeeded if the comparison write command unit updates data in the predetermined area to the third data, and replies to the control device to the effect that the comparison write process has failed if the comparison write command unit keeps data in the predetermined area to be the second data, and wherein, upon receipt of a result to the effect that the comparison write process has failed, the read command issuance unit reissues the read command.

(Supplementary Note 4) The storage system according to any one of Supplementary Notes 1 to 3, wherein the storage system further includes a storage client unit that accesses the control device, and wherein the storage client unit holds, on the memory device, a record and management information in a continuous storage area that allows for one-time execution of a comparison write command.

(Supplementary Note 5) The storage system according to supplementary Note 4, wherein the storage client unit provides management to a storage area of the memory device by embedding predetermined information per predetermined size of the storage area.

(Supplementary Note 6) The storage system according to Supplementary Note 4 or 5, wherein the storage device holds duplicates of data for two or more of the memory devices, wherein the storage client unit reads from a relevant storage medium comparison information about the comparison write process on the individual memory devices, and wherein the storage client unit selects one main memory device by using a common method among the control devices, and, after the comparison write command on the main memory device succeeds, issues the read command and the comparison write command to the memory devices to which other duplicates are to be written.

(Supplementary Note 7) The storage system according to any one of Supplementary Notes 4 to 6, wherein the control device further includes an access response unit that receives a processing command from the storage client unit and returns a result of the processing command to the storage client unit, and wherein the access response unit notifies the storage client unit whether the comparison write process has succeeded or failed.

(Supplementary Note 8) The control device according to the second aspect described above.

(Supplementary Note 9) The memory device according to the third aspect described above.

(Supplementary Note 10) The data access method according to the fourth aspect described above.

(Supplementary Note 11) A method for controlling a memory device, the method including the steps of: storing data; and performing a comparison write process of comparing first data specified by the control device with second data stored into a predetermined area by the data memory unit and determining whether to update data in the predetermined area depending on a result of the comparison.

(Supplementary Note 12) The program recording medium according to the fifth aspect described above.

(Supplementary Note 13) A program recording medium that records a program causing a computer that controls a memory device to execute the processes of: storing data; and comparing predetermined first data with second data that is stored into a predetermined area, and determining whether to update data in the predetermined area depending on a result of the comparison.

The respective disclosures of the patent literatures described above are incorporated herein by reference. Modifications and adjustments of exemplary embodiments may be made within the bounds of the entire disclosure (including the scope of the claims) of the present invention, and also based on fundamental technological concepts thereof. Furthermore, various combinations and selections of various disclosed elements (including respective elements of the respective claims, respective elements of the respective examples, respective elements of the respective drawings, and the like) are possible within the bounds of the entire disclosure of the present invention. That is, the present invention clearly includes every type of transformation and modification that those skilled in the art can achieve according to the entire disclosure of the present invention including the claims and to technological concepts thereof. In particular, it should be understood that a range of values appearing herein includes any value and sub-range falling in the range as if they are specifically set forth herein even if not stated explicitly.

The present invention has been explained above with the above-described exemplary embodiments as exemplary examples. However, the present invention is not limited to the above-described exemplary embodiments. In other words, various aspects of the present invention that could be understood by those skilled in the art may be applied within the scope of the present invention.

The present application claims priority based on Japanese Patent Application No. 2014-058229 filed on Mar. 20, 2014, the entire disclosure of which is incorporated herein.

REFERENCE SIGNS LIST

1 Storage processing unit
3 Interconnected network communication implementing unit
4 Storage client unit
11 Access response unit
12, 1011 Read command issuance unit
13, 1012 Write buffer memory unit
14, 1013 Comparison write command unit
15 Write result receiving unit
16 Determination resending unit
21 Command processing unit
22 Read processing unit
23, 1022 Comparison write unit
24, 1021 Data memory unit
100 to 10X, 1010 Control device
200 to 20X, 1020 Memory device
300, 1030 Interconnected network
500, 1000 Storage system

The invention claimed is:

1. A storage system comprising:
at least one control device; and
at least one memory device that is connected to the at least one control device via an interconnected network,
wherein the at least one memory device comprises:
data memory unit that stores data; and
comparison write unit that performs a comparison write process of comparing first data specified by the at least one control device with second data stored into a predetermined area in the data memory unit and determining whether to update data in the predetermined area depending on a result of the comparison, and
wherein the at least one control device comprises:
read command issuance unit that issues a read command to the at least one memory device;
write buffer memory unit that holds data that has been read based on the read command; and
comparison write command unit that designates data written to the write buffer memory unit as the first data and instructs, in the form of a comparison write command, the at least one memory device to perform the comparison write process,
wherein the comparison write command unit notifies the at least one memory device of the first data, the predetermined area for writing, and third data to be written, and
wherein the comparison write unit updates data in the predetermined area to the third data if the first data is identical to the second data, and keeps data in the predetermined area to be the second data if the first data is not identical to the second data.

2. The storage system according to claim 1,
wherein the at least one memory device further comprises command processing unit that receives a command from the at least one control device and returns a result of processing of the command to the at least one control device,
wherein the at least one control device further comprises write result receiving unit that receives a result of the comparison write command,
wherein the command processing unit replies to the at least one control device to the effect that the comparison write process has succeeded if the comparison write command unit updates data in the predetermined area to the third data, and replies to the at least one control device to the effect that the comparison write process has failed if the comparison write command unit keeps data in the predetermined area to be the second data, and
wherein, upon receipt of a result to the effect that the comparison write process has failed, the read command issuance unit reissues the read command.

3. The storage system according to claim 1,
wherein the storage system further comprises storage client unit that accesses the at least one control device, and
wherein the storage client unit holds, on the at least one memory device, a record and management information in a continuous storage area that allows for one-time execution of a comparison write command.

4. The storage system according to claim 3, wherein the storage client unit provides management to a storage area of the at least one memory device by embedding predetermined information per predetermined size of the storage area.

5. The storage system according to claim 3,
wherein the storage system holds duplicates of data for two or more of the at least one memory device,
wherein the storage client unit reads from a relevant storage medium comparison information about the comparison write process on the individual two or more of the at least one memory device, and
wherein the storage client unit selects one main memory device by using a common method among two or more of the at least one control device connected to the two or more of the at least one memory device, and, after the comparison write command on the main memory device succeeds, issues the read command and the comparison write command to the two or more of the at least one memory device to which other duplicates are to be written.

6. A control device comprising:
read command issuance unit that issues a read command to a memory device;
write buffer memory unit that holds data that has been read based on the read command; and
comparison write command unit that designates data written to the write buffer memory unit as first data and performs a comparison write process of determining, based on a result of comparing the first data with second data stored into a predetermined area by the memory device, whether to update data in the predetermined area,
wherein the comparison write command unit notifies the memory device of the first data, the predetermined area for writing, and third data to be written, and
wherein a comparison write unit of the memory device updates data in the predetermined area to the third data if the first data is identical to the second data, and keeps data in the predetermined area to be the second data if the first data is not identical to the second data.

7. A memory device comprising:
data memory unit that stores data; and
comparison write unit that performs a comparison write process of comparing first data specified by a control device with second data stored into a predetermined area in the data memory unit and determining whether to update data in the predetermined area depending on a result of the comparison,
wherein the memory device is notified by a control device of the first data, the predetermined area for writing, and third data to be written, and
wherein a comparison write unit of the memory device updates data in the predetermined area to the third data if the first data is identical to the second data, and keeps data in the predetermined area to be the second data if the first data is not identical to the second data.

8. A data access method comprising the steps of:
issuing a notification of first data, a predetermined area for writing, and third data to be written;
issuing a read command to read the first data;
holding the first data into a first area; and
instructing to perform a comparison write process of determining, based on a result of comparing the first data with second data stored into the predetermined area that is different from the first area, whether to update data stored into the second area,
wherein data in the predetermined area is updated to the third data if the first data is identical to the second data, and data in the predetermined area is kept to be the second data if the first data is not identical to the second data.

9. A non-transitory computer readable recording medium that records a program causing a computer that controls a control device to execute the processes of:
   issuing a notification to a memory device of first data, a predetermined area for writing, and third data to be written;
   issuing a read command to the memory device to read the first data;
   holding the first data into a first area; and
   instructing to perform a comparison write process of determining, based on a result of comparing the first data with second data stored into the predetermined area that is different from the first area, whether to update data stored into the second area,
      wherein data in the predetermined area is updated to the third data if the first data is identical to the second data, and data in the predetermined area is kept to be the second data if the first data is not identical to the second data.

10. The storage system according to claim 1,
    wherein the at least one memory device further comprises command processing unit that receives a command from the at least one control device and returns a result of processing of the command to the at least one control device,
    wherein the at least one control device further comprises write result receiving unit that receives a result of the comparison write command,
    wherein the command processing unit replies to the at least one control device to the effect that the comparison write process has succeeded if the comparison write command unit updates data in the predetermined area to the third data, and replies to the at least one control device to the effect that the comparison write process has failed if the comparison write command unit keeps data in the predetermined area to be the second data, and
    wherein, upon receipt of a result to the effect that the comparison write process has failed, the read command issuance unit reissues the read command.

11. The storage system according to claim 1,
    wherein the storage system further comprises storage client unit that accesses the at least one control device, and
    wherein the storage client unit holds, on the at least one memory device, a record and management information in a continuous storage area that allows for one-time execution of a comparison write command.

12. The storage system according to claim 2,
    wherein the storage system further comprises storage client unit that accesses the at least one control device, and
    wherein the storage client unit holds, on the at least one memory device, a record and management information in a continuous storage area that allows for one-time execution of a comparison write command.

13. The storage system according to claim 4,
    wherein the storage system holds duplicates of data for two or more of the at least one memory device,
    wherein the storage client unit reads from a relevant storage medium comparison information about the comparison write process on the individual two or more of the at least one memory device, and
    wherein the storage client unit selects one main memory device by using a common method among two or more of the at least one control device connected to the two or more of the at least one memory devices, and, after the comparison write command on the main memory device succeeds, issues the read command and the comparison write command to the two or more of the at least one memory device to which other duplicates are to be written.

* * * * *